US011170353B2

(12) United States Patent
Daggubati et al.

(10) Patent No.: US 11,170,353 B2
(45) Date of Patent: Nov. 9, 2021

(54) SYSTEMS AND METHODS FOR AUTOMATIC BILL ENROLLMENT

(71) Applicant: MASTERCARD INTERNATIONAL INCORPORATED, Purchase, NY (US)

(72) Inventors: Lakshmi Sushma Daggubati, O'Fallon, MO (US); Sri Chaitanya Sanaboina, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/400,285

(22) Filed: May 1, 2019

(65) Prior Publication Data

US 2020/0349535 A1 Nov. 5, 2020

(51) Int. Cl.
*G06Q 20/10* (2012.01)
*G06Q 20/36* (2012.01)
*G06Q 20/22* (2012.01)

(52) U.S. Cl.
CPC ......... *G06Q 20/102* (2013.01); *G06Q 20/227* (2013.01); *G06Q 20/363* (2013.01)

(58) Field of Classification Search
None
See application file for complete search history.

(56) References Cited

U.S. PATENT DOCUMENTS

| | | | |
|---|---|---|---|
| 7,080,035 B1 * | 7/2006 | Williams | G06Q 20/102 705/35 |
| 7,725,427 B2 * | 5/2010 | Bishop | G06Q 20/327 707/950 |
| 7,937,467 B2 | 5/2011 | Barber | |
| 8,311,943 B2 * | 11/2012 | Patterson | G06Q 30/04 705/40 |
| 8,484,104 B1 * | 7/2013 | Hurlbutt | G06Q 40/00 705/30 |
| 8,700,527 B2 * | 4/2014 | Dolphin | G06Q 20/385 705/40 |
| 8,706,622 B2 * | 4/2014 | Winters | G06Q 20/102 705/40 |
| 9,311,634 B1 * | 4/2016 | Hildebrand | G06Q 20/14 |
| 9,443,268 B1 | 9/2016 | Kapczynski et al. | |

(Continued)

*Primary Examiner* — Christopher Bridges
(74) *Attorney, Agent, or Firm* — Armstrong Teasdale LLP

(57) ABSTRACT

An automatic billing enrollment (ABE) computing device and methods for automatically enrolling a merchant in a bill paying application are provided. The ABE computing device receives a payment transaction associated with a cardholder account, identifies a merchant associated with the payment transaction, and determines whether the merchant is enrolled with a bill pay application associated with the cardholder account by performing a database lookup of enrolled merchants. The ABE computing device then transmits a message to a user device associated with the cardholder account indicating that the identified merchant is not enrolled by the cardholder with the bill pay application and includes an option for the cardholder to enroll the merchant. To enroll the merchant, the ABE computing device determines merchant-associated data elements required by the bill pay application to enroll the merchant, retrieves the data elements, and inputs the data elements into the bill pay application.

18 Claims, 10 Drawing Sheets

(56) References Cited

U.S. PATENT DOCUMENTS

| | | | |
|---|---|---|---|
| 2005/0203844 A1* | 9/2005 | Ferguson | G06F 16/9535 |
| | | | 705/40 |
| 2013/0066775 A1* | 3/2013 | Milam | G06Q 20/14 |
| | | | 705/40 |
| 2015/0235187 A1 | 8/2015 | Brunet et al. | |

* cited by examiner

1

SYSTEMS AND METHODS FOR AUTOMATIC BILL ENROLLMENT

BACKGROUND

This disclosure relates generally to push payment services and, more specifically, to automatic enrollment of a merchant with a bill payment application so that a cardholder can utilize the bill payment application to push payment to the merchant.

Push-type payments are those in which a transfer of funds is initiated from a sending account (e.g., a user/cardholder/payor account). Pull-type payments are those in which the transfer of funds is initiated by the receiving account (e.g., a merchant/seller/payee account). For pull-type payments, the payee must be given payor account-identifying information in order to initiate, access, and complete the transfer of funds. In these cases, a user provides an account number and routing number for direct transfer of funds from the user/cardholder account to a merchant's account. In contrast, for push-type payments the user/cardholder does not need to provide any account-identifying information to the merchant. Accordingly, push-type payments are typically more secure than pull-type payments.

In view of the multitude of accessible merchant goods and services available for payment using bill pay applications there is, however, a lack of accommodation for automatically enrolling merchants in said bill pay applications via centralized devices and systems and based on actual purchase transactions. Accordingly, systems and methods are needed that enable a user/cardholder to make a purchase transaction and have the merchant automatically enrolled in a bill pay application utilized by the cardholder and associated with the cardholder's account(s). The systems and methods described herein resolve at least these known deficiencies.

BRIEF DESCRIPTION OF THE DISCLOSURE

In one aspect, an automatic billing enrollment (ABE) computing device including a processor communicatively coupled to a memory is provided. The ABE computing device is in communication with a payment network. The ABE computing device is configured to receive a payment transaction associated with a cardholder account, and to identify a merchant associated with the payment transaction. The ABE computing device is further configured to determine whether the merchant is enrolled with a bill pay application associated with the cardholder account by performing a database lookup of the merchant wherein the database includes merchants enrolled by the cardholder with the bill pay application, and to transmit a message to a user device associated with the cardholder account wherein the message indicates that the identified merchant is not enrolled by the cardholder with the bill pay application, and wherein the message includes a selectable option for the cardholder to enroll the merchant in the bill pay application. In response to receiving a positive selection from the user device to enroll the merchant with the bill pay application, the ABE computing device is also configured to determine one or more data elements required by the bill pay application to enroll the merchant, retrieve the one or more data elements, and input the retrieved data elements into the bill pay application to complete enrollment of the merchant.

In another aspect, a method for automatically enrolling a merchant in a bill paying application is provided. The method is performed using an automatic billing enrollment (ABE) computing device including a processor communicatively coupled to a memory. The ABE computing device is in communication with a payment network. The method includes receiving a payment transaction associated with a cardholder account, and identifying a merchant associated with the payment transaction. The method further includes determining whether the merchant is enrolled with a bill pay application associated with the cardholder account by performing a database lookup of the merchant wherein the database includes merchants enrolled by the cardholder with the bill pay application, and transmitting a message to a user device associated with the cardholder account wherein the message indicates that the identified merchant is not enrolled by the cardholder with the bill pay application, and wherein the message includes a selectable option for the cardholder to enroll the merchant in the bill pay application. Responsive to receiving a positive selection from the user device to enroll the merchant with the bill pay application, the method also includes determining one or more data elements required by the bill pay application to enroll the merchant, retrieving the one or more data elements, and inputting the retrieved data elements into the bill pay application to complete enrollment of the merchant.

In yet another aspect, a non-transitory computer-readable storage medium having computer-executable instructions embodied thereon is provided. When executed by an automatic billing enrollment (ABE) computing device in communication with a payment network, the ABE computing device including a processor communicatively coupled to a memory, the computer-executable instructions cause the ABE computing device to receive a payment transaction associated with a cardholder account, and to identify a merchant associated with the payment transaction. The computer-executable instructions further cause the processor to determine whether the merchant is enrolled with a bill pay application associated with the cardholder account by performing a database lookup of the merchant wherein the database includes merchants enrolled by the cardholder with the bill pay application, and to transmit a message to a user device associated with the cardholder account wherein the message indicates that the identified merchant is not enrolled by the cardholder with the bill pay application, and wherein the message includes a selectable option for the cardholder to enroll the merchant in the bill pay application. In response to receiving a positive selection from the user device to enroll the merchant with the bill pay application, the computer-executable instructions also cause the processor to determine one or more data elements required by the bill pay application to enroll the merchant, the one or more data elements being associated with the merchant, cause the processor to retrieve the one or more data elements, and cause the processor to input the retrieved data elements into the bill pay application to complete enrollment of the merchant.

BRIEF DESCRIPTION OF THE DRAWINGS

FIGS. 1-7 show example embodiments of the methods and systems described herein.

FIG. 1 is an example multi-party payment card processing system in data communication with an automatic billing enrollment (ABE) computing device.

FIG. 3 is an example database structure for use with the ABE computing device.

FIG. 4 illustrates an example configuration of a remote device for use in the system shown in FIG. 1.

FIG. 5 illustrates an example configuration of a server system for use in the system shown in FIG. 1.

FIG. 6 is a flowchart of an example process for automatically enrolling a merchant with a bill pay application using the ABE computing device shown in FIG. 1.

FIG. 7 is a diagram of example components of the ABE computing device shown in FIG. 1.

Figure 1:
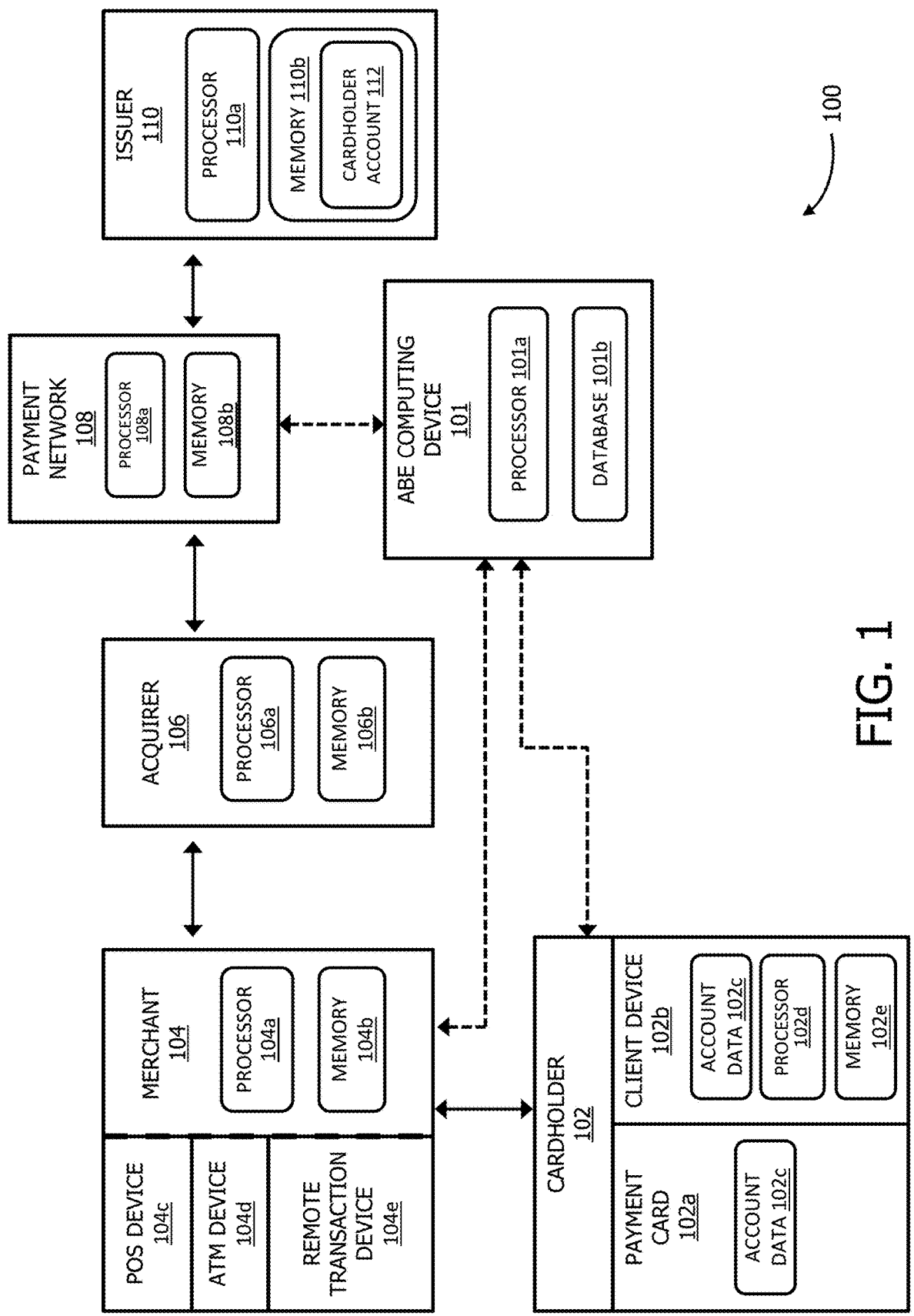

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The embodiments described herein include an automatic bill enrollment (ABE) system that includes an ABE computing device, and methods for providing automatic enrollment of merchants in bill pay applications of a cardholder in real-time. As defined herein, real-time relates to the ABE computing device processing data within a short period of time or as the user is performing the tasks with a computing device (e.g., milliseconds to seconds, or possibly minutes depending upon the task) so that the data output and/or input is available virtually immediately.

In the example embodiment, the ABE computing device is in communication with a merchant computing device, a cardholder (e.g., a user/consumer) computing device, and a payment network/payment processor computing device. The ABE computing device is configured to (i) receive a payment transaction associated with a cardholder account (e.g., while the payment transaction is being processed over the payment network), (ii) identify a merchant associated with the payment transaction, (iii) determine whether the merchant is enrolled with a bill pay application associated with the cardholder account by performing a database lookup of the merchant, wherein the database includes merchants enrolled by the cardholder with the bill pay application, (iv) transmit a message to a user device associated with the cardholder account, the message indicating that the identified merchant is not enrolled by the cardholder with the bill pay application, the message including a selectable option to enroll the merchant in the bill pay application, and in response to receiving a positive selection from the user device to enroll the merchant with the bill pay application, (v) determine one or more data elements required by the bill pay application to enroll the merchant, the one or more data elements being associated with the merchant, (vi) retrieve the one or more data elements, and (vii) input the retrieved data elements into the bill pay application to complete enrollment of the merchant. The ABE computing device is an unconventional, specialized computing device that is specifically configured to be capable of functioning as described herein, and may include dedicated computing components associated solely with the ABE computing device. In the example embodiment, the ABE computing device includes at least a processor in communication with a memory.

The ABE computing device further includes a database in wired and/or wireless communication with the ABE computing device. In some embodiments, the database is a centralized database that is integral to the ABE computing device, or in alternative embodiments the database is a separate component and external to the ABE computing device. The database is accessible to the ABE computing device and is configured to store and/or otherwise maintain a variety of information, as described further herein. For example, the database may store cardholder account data such as payment account identifiers, cardholder-associated bill pay applications and merchant data included therein, generalized bill pay application data and generalized merchant data included therein, communication rules and/or any other data and/or information. The database is configured to store data to more efficiently and seamlessly provide transaction-based automatic merchant enrollment into a bill pay application of the cardholder. In some embodiments, the ABE computing device is configured to perform database lookups, for example to determine whether the merchant is enrolled with a bill pay application associated with the cardholder account, to determine one or more data elements required by the bill pay application to enroll the merchant, and to retrieve one or more data elements (when the merchant is found in the database).

According to one or more example embodiments, the ABE computing device enables a cardholder to sign-up or register with the ABE computing device in order to receive automatic billing enrollment services for one or more cardholder accounts and/or one or more cardholder-associated bill payment applications. For example, upon registration a cardholder provides payment account identifiers for each payment account they use (or might wish to use) with a bill payment application. Payment account data and identifiers will enable the ABE computing device to receive payment transactions from the payment network that are associated with the cardholder. The ABE computing device will be further enabled to identify a merchant from a received purchase transaction and to pursue automatic enrollment of the merchant into the cardholder's preferred bill payment application according to the methods disclosed herein. Upon registration, the cardholder also provides a listing of bill pay applications (at least one bill pay application) that they currently use (or wish to begin using), which additionally includes bill pay application data of the merchants already enrolled by the cardholder in the bill pay application(s) associated with the cardholder. Accordingly, the ABE computing device is further enabled to automatically enroll an identified merchant with at least one of the bill pay applications listed by the cardholder. Registration with the ABE computing device may be done automatically, such as by the issuer upon issuance of a cardholder account. Alternatively, registration with the ABE computing device may be done manually as desired by a cardholder.

In the example embodiment, the ABE computing device is configured to receive a payment transaction associated with a cardholder account. For example, as described above, the ABE computing device is enabled to receive payment transactions from the payment network based on payment account identifiers of cardholders that have been registered with the ABE computing device to receive automatic billing enrollment services. The ABE computing device is configured to convert an online, merchant website purchase transaction (where payment account data is stored by a merchant) to a bill pay application transaction (where payment account data is stored by the cardholder's bill pay application). That is, the ABE computing device converts a less secure pull-type payment transaction (e.g., a payment transaction that is initiated by the merchant) into a more secure push-type payment transaction (e.g., a payment transaction that is initiated by the cardholder's bank).

In the example embodiment, the ABE computing device is configured to identify a merchant associated with the payment transaction. The payment transaction contains various data regarding the transaction, such as date, time, merchant, location, payment type/method, payment account identifier, item(s) purchased (wherein an item may be a good or service being sold by the merchant), item cost, total cost, and/or other applicable data related to the transaction. Upon identifying the merchant associated with the payment transaction, the ABE computing device will attempt to enroll the merchant in a bill payment application associated with the cardholder as described herein below.

In the example embodiment, the ABE computing device is configured to determine whether the merchant is enrolled with a bill pay application associated with the cardholder account by performing a database lookup of the merchant, wherein the database includes merchants enrolled by the cardholder with the bill pay application. As described above, the cardholder provided payment account identifiers as well as a listing of their utilized/preferred bill payment applications upon registration with the ABE computing device. Also upon registration, the cardholder provided data regarding the merchants already enrolled in their bill pay application(s). The cardholder data, including payment account identifiers and bill pay application data is stored by the ABE computing device in the database associated with the ABE computing device. Once a merchant is identified from a purchase transaction, the ABE computing device performs a lookup of its associated database to find out if the merchant is one that is already enrolled in the cardholder's bill pay application(s). In some embodiments, the bill pay application associated with the cardholder includes a plurality of bill pay applications associated with the cardholder. If the merchant is found in the database lookup as one that is already enrolled in a bill pay application of the cardholder, then the ABE computing device will end the automatic enrollment process of the merchant as unnecessary and to avoid redundancy of merchants enrolled within a cardholder's bill pay application(s) If the merchant is not found in the database lookup, the ABE computing device will continue the automatic enrollment process by communicating with the cardholder (e.g., by transmitting a message to the cardholder via a user device associated with the cardholder).

In the example embodiment, the ABE computing device is configured to transmit a message to a user device associated with the cardholder account, the message indicating that the identified merchant is not enrolled by the cardholder with the bill pay application, the message including a selectable option to enroll the merchant in the bill pay application. If the cardholder selects negatively (to not enroll the merchant), then the ABE computing device will end the automatic enrollment process of the merchant based on the cardholder's selection. If the cardholder selects positively (to enroll merchant), then the ABE computing device will continue the automatic enrollment process. In some embodiments, when a bill pay application of the cardholder includes a plurality of bill pay applications, the selectable option to enroll the merchant in the bill pay application further includes a selectable option of one of the plurality of bill pay application associated with the cardholder with which to enroll the merchant. In at least one embodiment, the selectable option may be included in the message in a single display or in subsequent displays. For instance, the message may display the selectable option as [Do you want to enroll merchant "Q": yes, in bill pay app "X // yes, in bill pay app "Y"//no, do not enroll]. As another example, the message may display the selectable option as a first display [yes, enroll // no, do not enroll], followed by a subsequent second display [Which app to enroll merchant "Q": bill pay app "X"// or bill pay app "Y"]. The positive selection to enroll the merchant (as well as the selection of a particular bill pay application in which to enroll the merchant, depending on the embodiment) is received by the ABE computing device from the cardholder's client device. Alternatively, in some embodiments, when there is a plurality of bill pay applications associated with a cardholder, a default bill pay application may be selected or the ABE computing device may select a particular bill pay application in which to enroll the merchant. For example, during registration with the ABE computing device to receive automatic billing enrollment services, the cardholder may indicate a default bill pay application in which to enroll new merchants.

Subsequently, and in response to receiving a positive selection from the user device to enroll the merchant with the bill pay application, the ABE computing device is configured to determine one or more data elements required by the bill pay application (e.g., the selected bill pay application, in some embodiments) to enroll the merchant, the one or more data elements being associated with the merchant. The database associated with the ABE computing device also contains generalized bill payment application data (e.g., bill payment application data that is not associated with a specific cardholder). In the example embodiment, the database includes a listing of various bill payment applications as well as corresponding respective listings of one or more data elements associated with a merchant that would be required in order to enroll the merchant with the bill pay application. For example, bill payment application "X" may require merchant name, merchant address, and merchant phone number data elements in order to enroll the merchant. Alternative, additional, or fewer data elements may be required based on the requirements of the particular bill payment application. In some embodiments, the database may include the populated data element fields for a particular merchant with respect to a particular bill payment application. In some embodiments, bill pay application data may be compiled in the database by extracting generalized merchant data (e.g., data elements associated with the merchant that are required by the bill pay application) from cardholder-associated bill payment applications. For instance, when a cardholder registers with the ABE computing device for automatic billing enrollment services, the bill pay applications listed by the cardholder (and the merchants already enrolled in those bill pay applications) may be listed in the database additionally and separately from the cardholder data. In this example, cardholder "A" may list bill payment application "X" as one of their bill payment applications upon registration with the ABE computing device, and bill payment application "X" may include merchant "P", merchant "Q", and merchant "R" as merchants already enrolled by cardholder "A". Continuing with this example, cardholder "B", upon registration with the ABE computing device, may also list bill payment application "X" and which includes merchant "S" and merchant "T" as merchants already enrolled by cardholder "B". Consequently, in this example, the database may list bill payment application "X" as including populated data element fields for each of merchants "P", "Q", "R", "S", and "T" since those merchant-associated data elements were provided for bill payment application "X" upon registration of various cardholders. According to the example, when a registered cardholder "C" positively selects to enroll e.g., merchant "Q" with bill payment application "X", the ABE computing device will determine the one or more data elements required by bill payment application "X" and will further determine that the required data elements for merchant "Q" are available in the database as populated data element fields as previously provided and extracted from cardholder "A" bill payment application and merchant data.

In the example embodiment, the ABE computing device is configured to retrieve the one or more data elements. Upon determining the required data elements for the particular bill payment application, the ABE computing device is configured to perform a database lookup of the merchant in the bill payment application data of the database. In embodiments when the merchant is found in the database lookup, the required data elements may be retrieved directly from the database as populated data element fields. In embodiments when the merchant is not found in the database lookup, the ABE computing device is configured to request the one or more data elements from the merchant, such as by transmitting a data element request message to the merchant. The ABE computing device is further configured to receive the one or more data elements from the merchant as populated data element fields. In some embodiments, requesting the data elements from the merchant may be an internet search (e.g., via a search engine) to obtain the required merchant-associated data elements. In embodiments when the merchant is not found in the database lookup and the ABE computing device requests the data elements from the merchant (or a search engine), the received data elements are subsequently stored in the database associated with the ABE computing device with respect to the bill payment application data and corresponding merchant data elements. In this way, the ABE computing device may avoid redundant retrieval of data elements for each merchant/bill payment application combination, thereby reducing processing time. In some embodiments, relevant merchant-associated data elements may be retrieved from the database even if that merchant is listed under a different bill payment application, although it is understood that other data elements may still need to be retrieved from the merchant in order to populate each and every data element field for a bill payment application required to enroll a merchant.

In the example embodiment, the ABE computing device is also configured to input the retrieved data elements into the bill pay application to complete enrollment of the merchant. In some embodiments, inputting the retrieved data elements is performed via the cardholder's client device, via the payment network, via the bill payment application, and/or via the issuer. In embodiments when enrollment is completed at least via the client device, the ABE computing device may transmit a notification message to the client device indicating that the merchant has been enrolled. In these embodiments, the notification message may further include a selectable link to view and/or edit options and/or settings of the newly-enrolled merchant. For example, a cardholder may touch/click/select the options/settings selectable link in order to choose a recurring monthly payment date to push payment to the merchant, for example, for a monthly membership (such as when the payment transaction received by the ABE computing device was a payment for a first month of membership).

In some embodiments, the ABE computing device is further configured to transmit a data scrub request message to the merchant following enrollment of the merchant in the selected bill payment application. The data scrub request message may include a notification to the now-enrolled merchant that the cardholder associated with the payment transaction has elected to enroll that merchant in a bill pay application, and that consequently the cardholder will be providing payment to the merchant via push-type, cardholder/issuer-initiated payments. The data scrub request message may further include a notification that the merchant should scrub/delete the cardholder's payment account data from their own database(s), and/or a notification that the merchant is no longer required and/or permitted to initiate any additional pull-type payments from the cardholder's account(s). In another embodiment, the data scrub request message may include a code snippet that, when executed by the merchant computing device, causes the merchant computing device to automatically delete the cardholder account data so that data is no longer stored at the merchant, thereby reducing risk of data breaches.

The ABE computing device described herein provides a convenient and efficient automatic billing enrollment experience. Merchant enrollment in a cardholder's bill pay application is achieved automatically based on the cardholder's purchase transactions with the merchant. Automatic merchant enrollment with a cardholder's bill pay application enables a seamless and more secure approach to making payments to the merchant, e.g., for goods and services such as memberships and subscriptions. By eliminating a need for multiple merchants to separately store the cardholder's payment account information/data, the system reduces a risk of compromise of the cardholder's account via a data breach of a merchant, thereby improving the functionality of the payment card interchange network. Additionally, automatic population of the merchant fields in the bill payment application reduces a risk of uncompleted or erroneous payment due to errors in manual data entry, thereby improving the functionality of the bill payment application.

The methods and systems described herein may be implemented using computer programming or engineering techniques including computer software, firmware, hardware, or any combination or subset therefor. At least one of the technical problems addressed by this system includes: (i) lack of security for cardholder account data with frequent pull-type payments being made by a merchant; (ii) increased storage requirements for the merchant to maintain cardholder account data for initiating pull-type payments, as well as increased risk of a data breach of cardholder account data; (iii) increased payment network traffic when merchants initiate pull-type payments, requiring a request message to the issuer over the network as well as a response message from the issuer over the network to pay the merchant/ acquirer; (iv) lack of real-time merchant enrollment based on a recent payment transaction because the cardholder must remember to manually enroll a merchant; (v) lack of real-time payment for the merchant initiating a pull-type payment because the merchant must wait for authorization from the issuer based on cardholder account fund-availability; and (vi) lack of a centralized database for storing cardholder and bill payment application data associated with automatic billing enrollment.

The technical effect of the systems and methods described herein is achieved by performing at least one of the following steps: (i) receiving a payment transaction associated with a cardholder account; (ii) identifying a merchant associated with the payment transaction; (iii) determining whether the merchant is enrolled with a bill pay application associated with the cardholder account by performing a database lookup of the merchant, wherein the database includes merchants enrolled with the bill pay application; (iv) transmitting a message to a user device associated with the cardholder account, the message indicating that the identified merchant is not enrolled with the bill pay application, the message including a selectable option to enroll the merchant in the bill pay application; and responsive to receiving a positive selection from the user device to enroll the merchant with the bill pay application, (v) determining one or more data elements required by the bill pay application to enroll the merchant, the one or more data elements being associated with the merchant; (vi) retrieving the one or more data elements; and (vii) inputting the retrieved data elements into the bill pay application to complete enrollment of the merchant.

The resulting technical effect achieved by the systems and methods described herein is at least one of: (i) increased security for cardholder since they no longer need to worry about a merchant misusing their account data for pull-type payments; (ii) decreased storage required for a merchant since they no longer need to store cardholder data for pull-type payments, as well as increased security for the merchant since they no longer need to store cardholder data at the risk of a data breach; (iii) decreased network burden for push-type payments initiated from the cardholder's account (e.g., elimination of the merchant's requirement to send a pull-type payment request message to the issuer over the payment network); (iv) real-time merchant enrollment based on a recent payment transaction with the merchant; (v) real-time payment to the merchant as scheduled with the bill pay application once a merchant is enrolled; and (vi) improved storage and unique database structuring for cardholder data and bill pay application data that is specifically associated with automatic billing enrollment.

In one embodiment, a computer program is provided, and the program is embodied on a computer-readable medium. In an example embodiment, the ABE computing device is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the ABE computing device includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to providing an automatic billing enrollment system in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system in data communication with an automatic billing enrollment (ABE) computing device 101. The present disclosure relates to payment card system 100, such as a credit card payment system using the MASTERCARD payment card system payment network 108 (also referred to as an "interchange" or "interchange network"). Mastercard payment card system payment network 108 (including processor 108a and memory 108b) is a proprietary communications standard promulgated by Mastercard International Incorporated for the exchange of financial transaction data between financial institutions that are members of Mastercard International Incorporated. (MASTERCARD is a registered trademark of Mastercard International Incorporated located in Purchase, N.Y.).

In payment card system 100, a financial institution such as an issuer 110 (including processor 110a and memory 110b) issues a payment card for an account, such as a credit card account or a debit card account, to a cardholder 102, who uses the payment card to tender payment for a purchase from a merchant 104 (including processor 104a and memory 104b). Cardholder 102 is representative of payment card 102a, such as a physical payment card storing account data 102c for example on a magnetic stripe and/or chip. Cardholder 102 is also representative of client device 102b. Cardholder client device 102b (including processor 102d and memory 102e) stores cardholder 102 account data 102c, e.g., within a digital wallet.

To accept payment with the payment card, merchant 104 must normally establish an account with a financial institution that is part of the financial payment system. This financial institution is usually called the "merchant bank" or the "acquiring bank" or "acquirer bank" or simply "acquirer". When a cardholder 102 tenders payment for a purchase with a payment card (also known as a financial transaction card), merchant 104 requests authorization from acquirer 106 (including processor 106a and memory 106b) for the amount of the purchase. Such a request is referred to herein as an authorization request message (e.g., ISO® 8583 compliant messages and ISO® 20022 compliant messages). The request may be performed over the telephone, but is usually performed through the use of a point-of-interaction terminal, which reads the cardholder's account data 102c from a magnetic stripe or chip on the payment card and communicates electronically with the transaction processing computers of acquirer 106. Point-of-interaction terminals include point-of-sale (POS) devices 104c, ATM devices 104d, and remote transaction devices 104e that are associated with merchant 104. Alternatively, acquirer 106 may authorize a third party to perform transaction processing on its behalf. In this case, the point-of-interaction terminal will be configured to communicate with the third party. Such a third party is usually called a "merchant processor" or an "acquiring processor."

For card-not-present (CNP) transactions, cardholder 102 provides payment information or billing data associated with the payment card electronically (e.g., via cardholder client device 102b and/or remote transaction device 104e) to merchant 104. The payment information received by merchant 104 is stored and transmitted to acquirer 106 and/or payment network 108 as part of an authorization request message. In some embodiments, merchant 104 transmits a plurality of authorization request messages together as a "batch" file to acquirer 106 and/or payment network 108.

Using payment card system payment network 108, the computers of acquirer 106 or the merchant processor will communicate with the computers of issuer 110, to determine whether the cardholder's account 112 is in good standing and whether the purchase is covered by the cardholder's available credit line or account balance. Based on these determinations, the request for authorization will be declined or accepted. If the request is accepted, an authorization code is issued to merchant 104.

When a request for authorization is accepted, the available credit line or available balance of cardholder's account 112 is decreased. Normally, a charge is not posted immediately to a cardholder's account because bankcard associations, such as Mastercard International Incorporated, have promulgated rules that do not allow a merchant to charge, or "capture," a transaction until goods are shipped or services are rendered. When a merchant ships or delivers the goods or services, merchant 104 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 112 is decreased. Normally, a charge is posted immediately to cardholder's account 112. The bankcard association then transmits the approval to the acquiring processor for distribution of goods/services, information, or cash in the case of an ATM.

After a transaction is captured, the transaction is settled between merchant 104, acquirer 106, and issuer 110. Settlement refers to the transfer of financial data or funds between the merchant's account, acquirer 106, and issuer 110 related to the transaction. Usually, transactions are captured and accumulated into a "batch," which is settled as a group.

Throughout the payment transaction process, automatic bill enrollment (ABE) computing device 101 (including processor 101a and database 101b) is in data communication with several other components of system 100, particularly cardholder 102, merchant 104, and network 108. ABE computing device 101 is configured to obtain and store cardholder 102 and merchant 104 related data, communicate with network 108 to identify payment transactions made by cardholder 102, obtain purchase-related data via network 108, parse purchase-related data from the purchase transaction including merchant 104 related data, communicate with merchants 104, and communicate with cardholder 102. ABE computing device 101 may be configured to perform additional or alternative steps depending on the specific embodiment.

FIGS. 2A-2D illustrate an example data flow of automatic billing enrollment of a merchant using ABE computing device 201 (similar to ABE computing device 101 shown in FIG. 1). Data flow 200a in FIG. 2A begins with step 1, in which ABE computing device 201 receives a payment transaction 203 associated with a cardholder account (e.g., cardholder "A") 212 (similar to cardholder account 112 shown in FIG. 1). This payment transaction 203 may, for example, be initiated by the cardholder using a website associated with the merchant, such as by the cardholder entering/providing payment account data via a merchant website to make a payment or purchase. In the example embodiment, the payment transaction 203 is received from payment network 208 (similar to payment network 108 shown in FIG. 1). Once received, the ABE computing device 201 begins the process of converting a pull-type transaction (where cardholder data is stored by the merchant) to a push-type transaction (where cardholder data is stored by the cardholder's bill pay application, e.g., stored by the cardholder's bank in embodiments when the bill pay application is an online banking application). ABE computing device 201 identifies (step 2) a merchant associated with the payment transaction (e.g., merchant "Q") 204. In step 3, ABE computing device 201 determines whether the merchant is enrolled with a bill pay application associated with the cardholder account by performing a database lookup of the merchant. Database 201b is similar to database 101b shown in FIG. 1, as well as database 301b shown in greater detail in FIG. 3 below. When ABE computing device 201 determines that the merchant is not already enrolled by the cardholder with a bill pay application associated with the cardholder (e.g., the merchant is not found in the database lookup of merchants already enrolled with bill pay applications of the cardholder), the automatic billing enrollment process continues as described below.

Figure 2A:
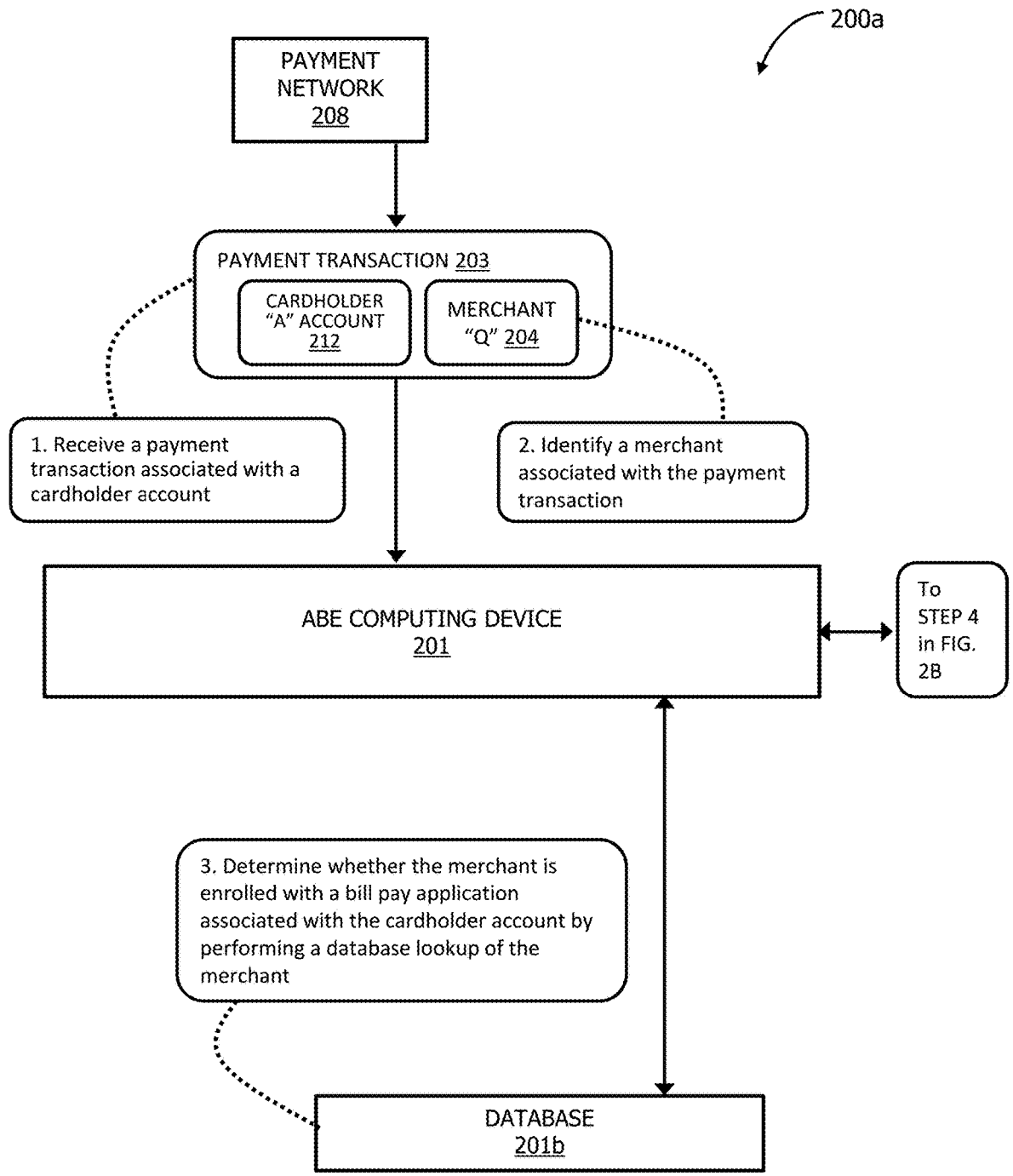
FIGS. 2A-2D illustrate an example data flow of automatic billing enrollment of a merchant using the ABE computing device.
Figure 2B:
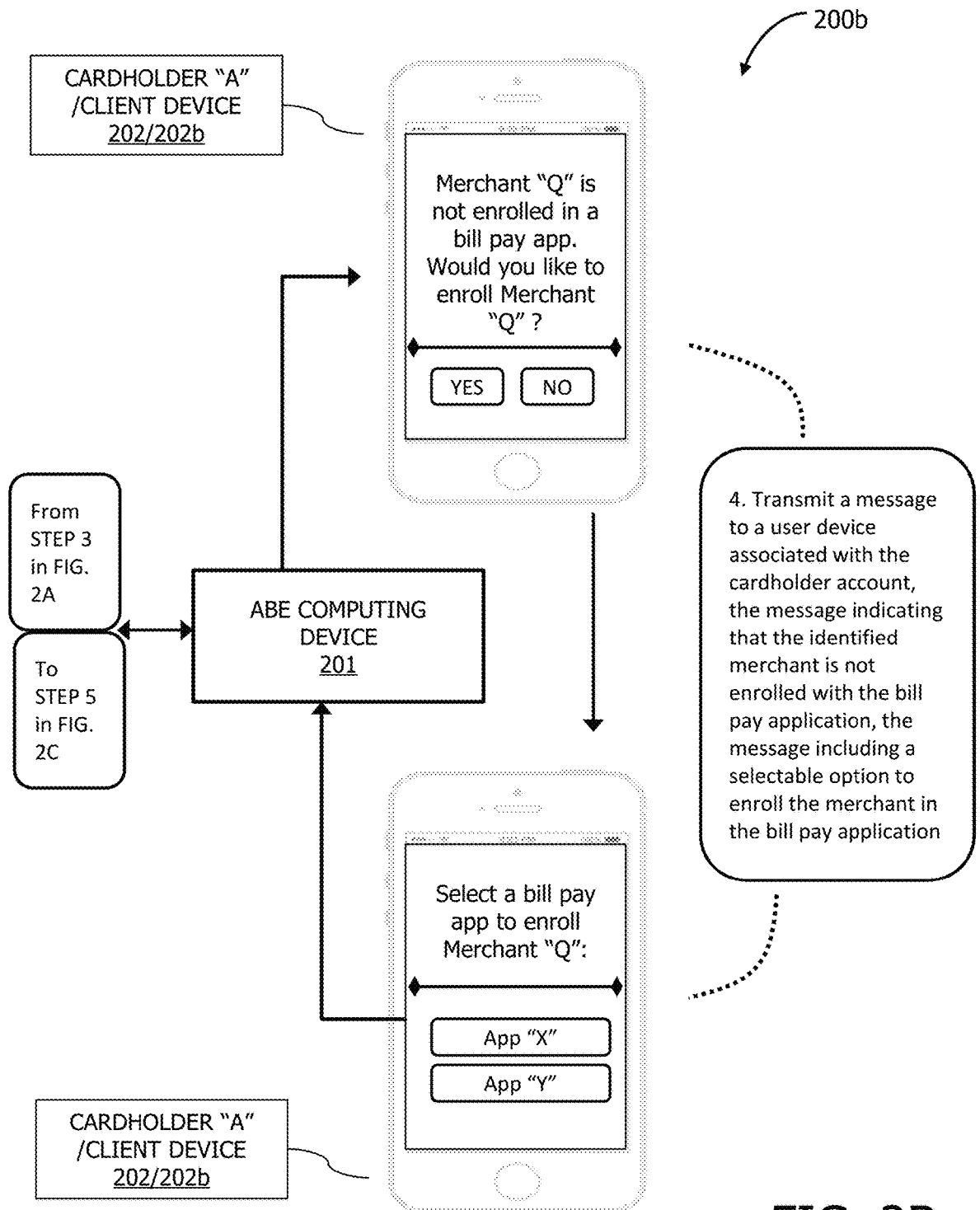

Data flow 200a in FIG. 2A proceeds to data flow 200b in FIG. 2B with step 4, in which ABE computing device 201 transmits a message to a user device 202b associated with the cardholder account, the message indicating that the identified merchant is not enrolled with the bill pay application, the message including a selectable option to enroll the merchant in the bill pay application. In some embodiments, when the cardholder positively selects to enroll the merchant and when a bill pay application associated with the cardholder includes a plurality of bill pay applications, a further selectable option is included in the message allowing the cardholder to select which bill pay application they wish to use for enrolling the merchant (e.g., bill pay app "X"). In some embodiments, the cardholder may have designated a default or preferred bill pay application for automatically enrolling new merchants. In some embodiments, the ABE computing device 201 may select the bill pay application in which to enroll the merchant. When ABE computing device 201 receives a positive selection from the cardholder/client device 202/202b to enroll the merchant, the automatic billing enrollment process continues as described below.

Figure 2C:
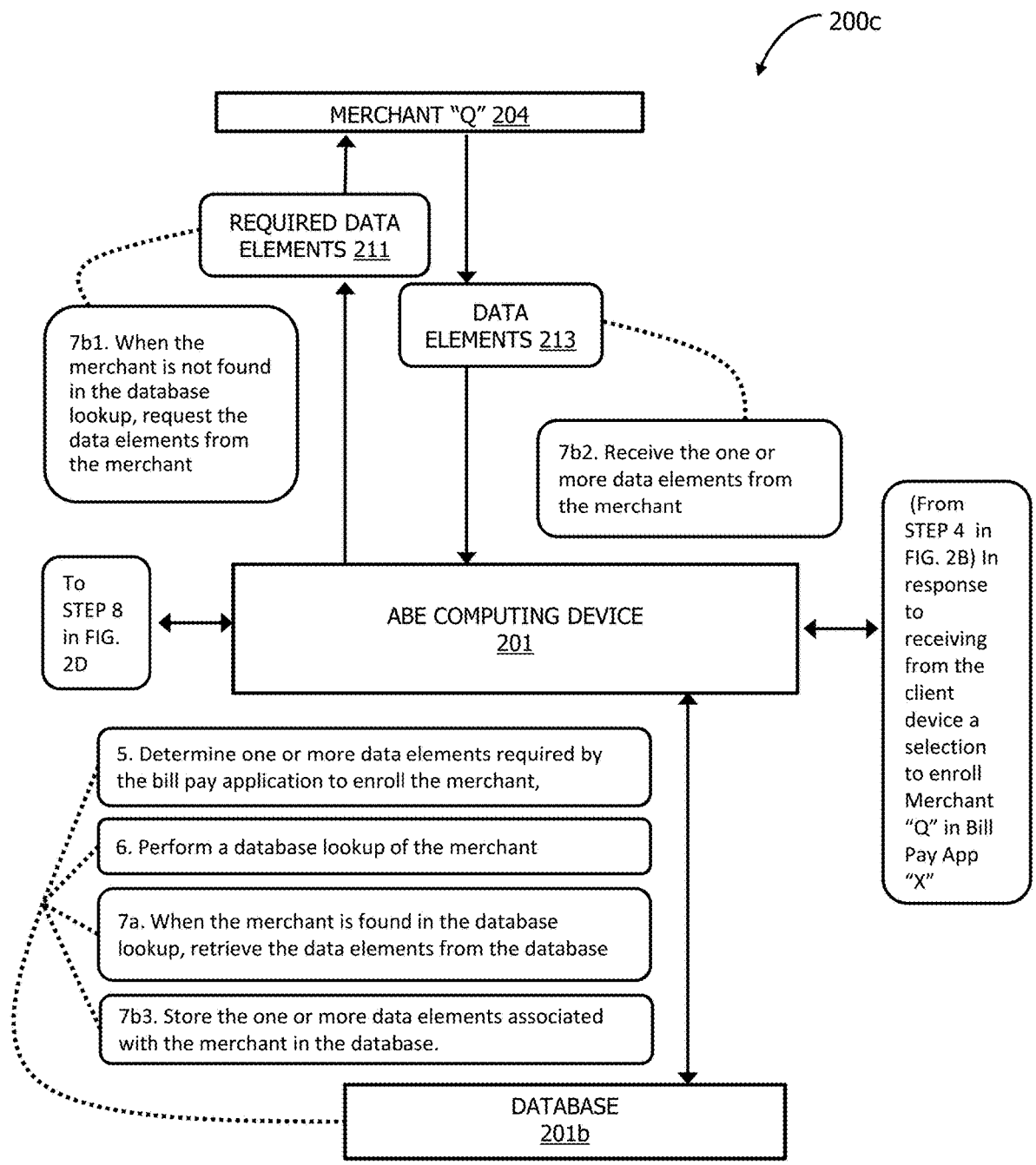

Data flow 200b in FIG. 2B proceeds to data flow 200c in FIG. 2C with step 5, in which ABE computing device 201 determines one or more data elements required by the bill pay application to enroll the merchant and performs a database lookup of the merchant in step 6. Depending on the embodiment, data flow 200c proceeds either through step 7a or 7b. In embodiments when the merchant is found in the database lookup as shown step 7a, ABE computing device 201 is configured to retrieve the data elements directly from the database. In embodiments when the merchant is not found in the database lookup as shown in step 7b1, ABE computing device 201 is configured to request the required data elements 211 from the merchant 204. Subsequently, ABE computing device 201 receives the one or more data elements 213 (which are the populated fields of the required data elements 311) in step 7b2. In step 7b3, ABE computing device 201 is configured to store in database 201b the one or more data elements 213 received from and associated with merchant 204.

Figure 2D:
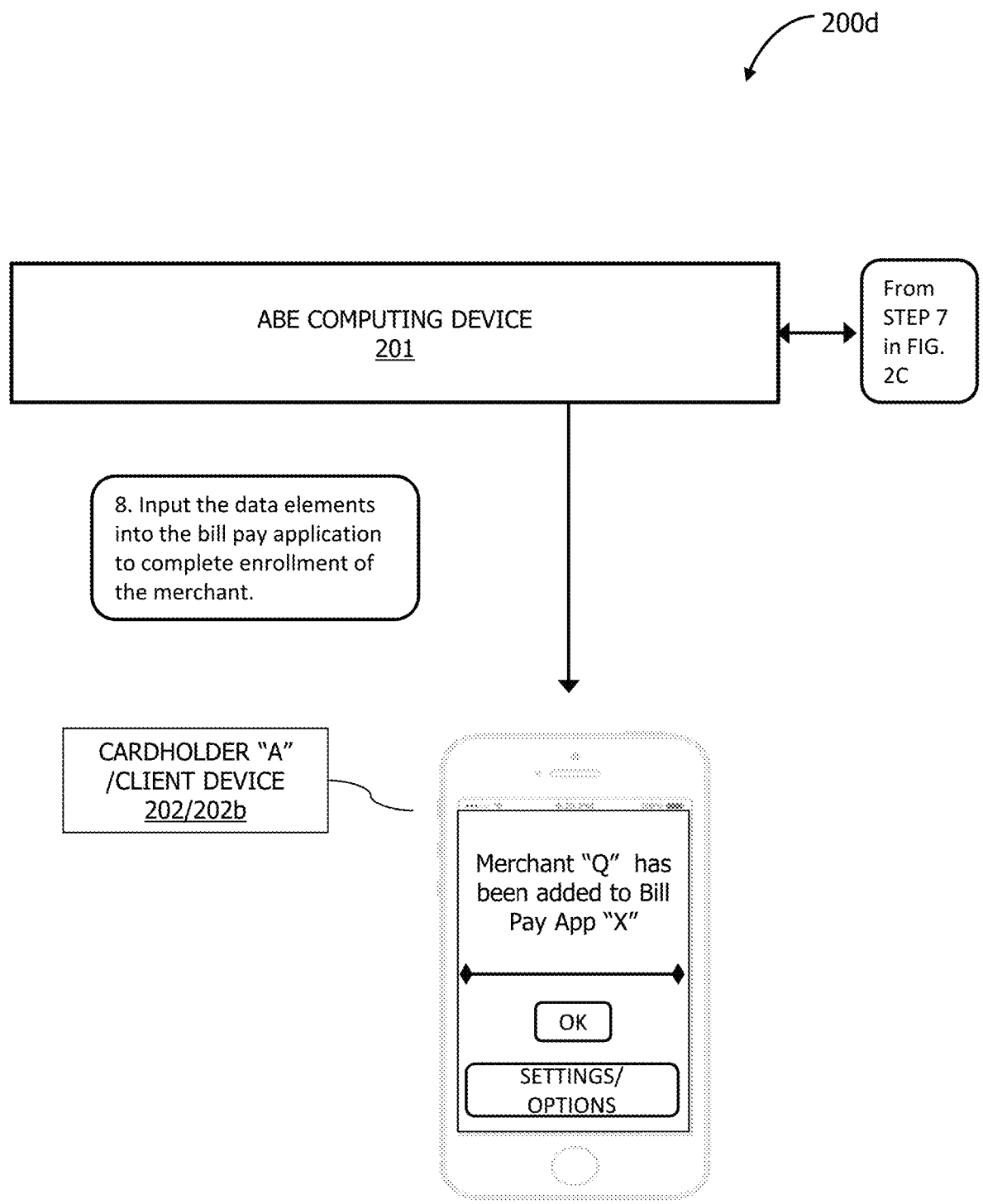

Data flow 200c in FIG. 2C proceeds to data flow 200d in FIG. 2D with step 8, in which ABE computing device 201 inputs the retrieved/received data elements into the bill pay application to complete enrollment of the merchant. In some embodiments, inputting proceeds via the cardholder/client device 202/202b and further includes transmitting a notification message to the client device indicating successful enrollment of the merchant. The notification message may include a selectable link to settings/options of the bill pay application to which the merchant was just enrolled.

Figure 3:
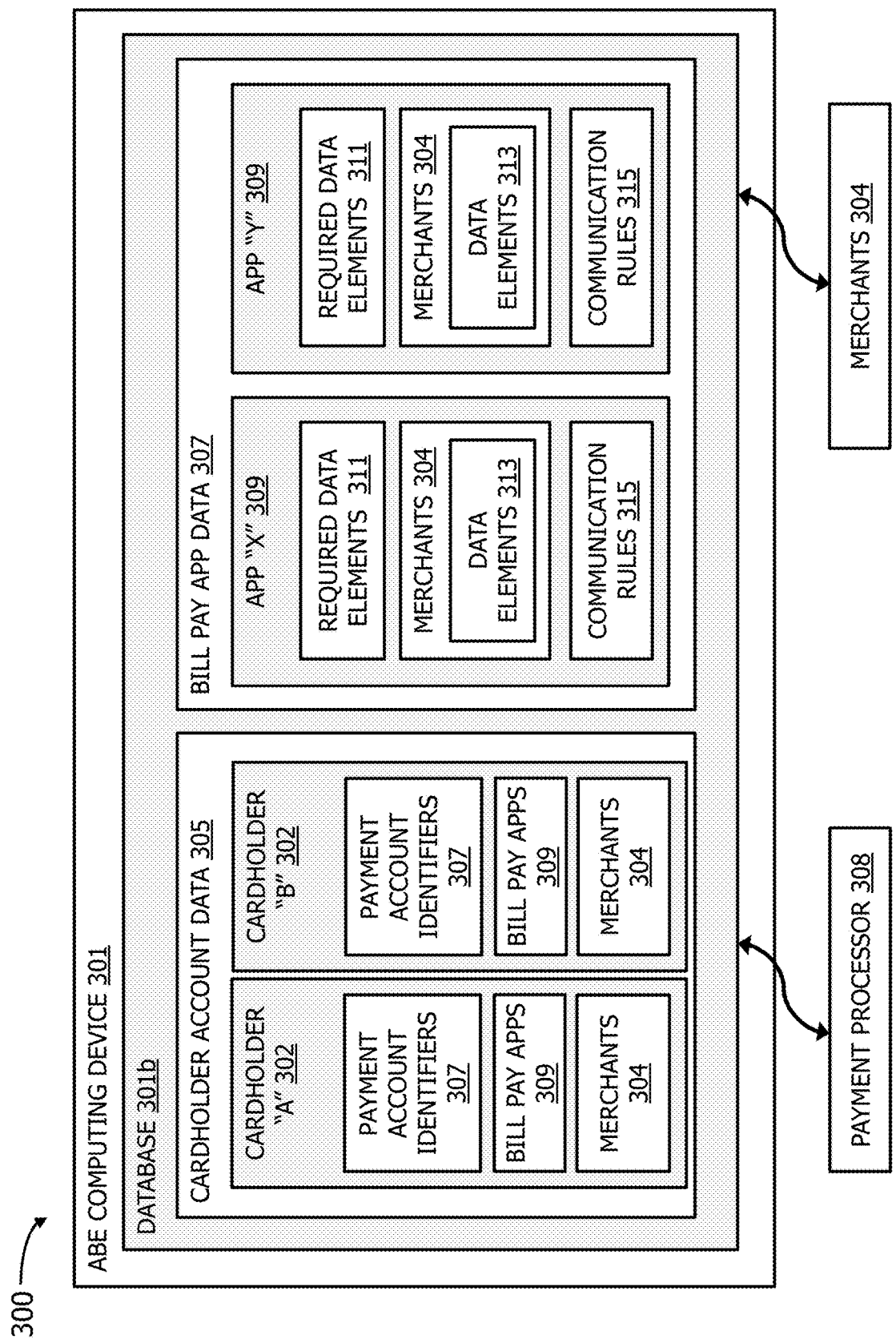

FIG. 3 depicts an example structure 300 of database 301*b* (similar to database 101*b* shown in FIG. 1) for use with ABE computing device 301 (similar to ABE computing device 101, shown in FIG. 1). In some embodiments, database 301*b* is a centralized database that is integral to ABE computing device 301 or database 301*b* is a separate component that is external and accessible to ABE computing device 301. Database 301*b* is also accessible and communicatively coupled to payment processor 308. Database 301*b* includes unique data configurations specifically suitable for automatically enrolling merchants in bill pay applications via ABE computing device 301. In the example embodiment, database 301*b* is configured to store cardholder account data 305 and bill pay app data 307.

Cardholder account data 305 includes data associated with cardholders 302, such as cardholder "A" and cardholder "B", that have registered with ABE computing device 301 to receive automatic billing enrollment services. For each cardholder 302, database 301*b* includes payment account identifiers 307 which are used to identify one or more cardholder payment accounts (such as cardholder account 112 shown in FIG. 1). For each cardholder 302, database 301*b* also includes a listing of bill pay apps provided by the cardholder (e.g., at least one bill pay app that the cardholder currently uses and/or at least one bill pay app that the cardholder wishes to use) as well as a listing of any merchants already enrolled by the cardholder for the bill pay app. Although two cardholders 302 are shown in FIG. 3, it is understood that any number of cardholders 302 may be represented in database 301*b*.

Bill pay app data 307 includes generalized bill pay app data (e.g., bill pay app data that is not associated with a specific cardholder). For instance, app "X" 309 and app "Y" 309 may correspond to bill pay apps 309 provided by cardholder 302 upon registration with ABE computing device 301 and have been extracted from cardholder account data 305 of database 301*b*. However, app "X" and app "Y" are no longer tied to a specific and/or particular cardholder 302 when stored within bill pay app data 307 of database 301*b*. Although two bill pay apps (app "X" 309 and app "Y" 309) are shown within bill pay app data 307 of FIG. 3, it is understood that any number of bill pay apps 309 may be represented in bill pay app data 307 of database 301*b*. Each app 309 of bill pay app data 307 further includes required data elements 311, merchants 304 and merchant-associated data elements 313, and communication rules 315. Required data elements 311 include a listing of merchant-associated data elements required by that particular bill pay app 309 to enroll a merchant. Merchants 304 and merchant-associated data elements 313 include generalized merchant data (e.g., merchant-related data that is not associated with a specific cardholder). For example, merchants 304 and merchant-associated data elements 313 may correspond to merchants 304 provided by cardholder 302 upon registration with ABE computing device 301 and have been extracted from cardholder account data 305 of database 301*b*. However, merchants 304 and data elements 313 within app "X" 309 or within app "Y" 309 are no longer tied to a specific and/or particular cardholder 302 when stored within bill pay app data 307 of database 301*b*. Data elements 313 indicate populated fields of required data elements 311 for bill pay app 309. Communication rules 315 includes instructions and/or controls for communicating with a merchant as needed, such as to request required data elements 311, and subsequently to receive and store data elements 313. In some embodiments, communication rules 315 may indicate that required data elements 311 are to be retrieved via a generalized internet search (e.g., via a search engine) as opposed to contacting a merchant directly. In some embodiments, communication rules 315 includes instructions and/or controls for transmitting a data scrub request message to a merchant, as described elsewhere herein.

In the example embodiment, database 301*b* is in communication with merchants 304 and payment processor 308 (e.g., payment network 108 shown in FIG. 1) via ABE computing device 301. The unique structure of database 301*b* enables uncomplicated and efficient automatic enrollment of merchants with bill pay applications, as well as improves network traffic by requiring only one payment message (initiated from the cardholder account/issuer) for a merchant payment.

Figure 4:
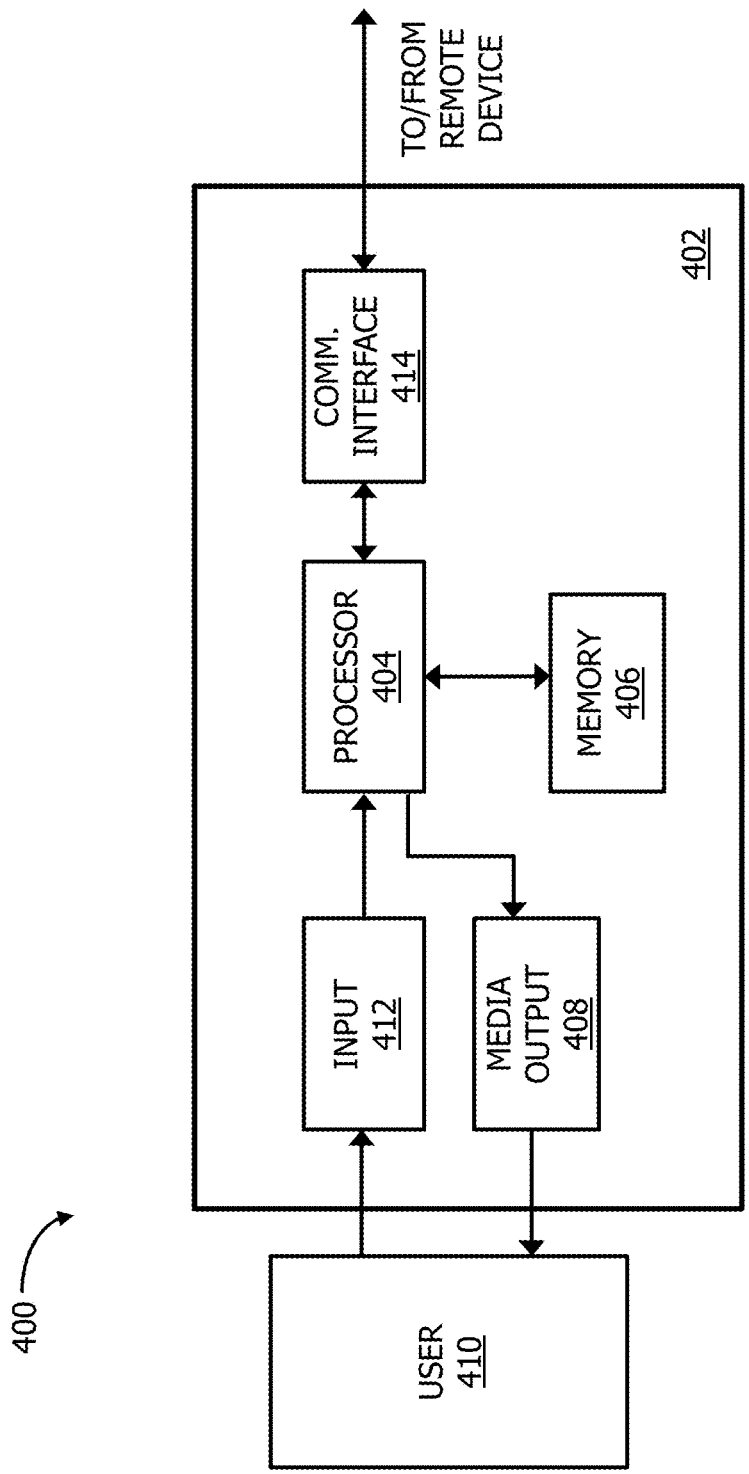

FIG. 4 depicts an exemplary configuration 400 of a remote or client computing device 402 (such as cardholder client device 102*b* and merchant computing devices 104 shown in FIG. 1). Computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 410. Media output component 408 is any component capable of conveying information to user 410. In some embodiments, media output component 408 includes an output adapter such as a video adapter and/or an audio adapter. An output adapter is operatively coupled to processor 404 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 408 is configured to present an interactive user interface (e.g., a web browser or client application) to user 410.

In some embodiments, client computing device 402 includes an input device 412 for receiving input from user 410. Input device 412 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 412.

Computing device 402 may also include a communication interface 414, which is communicatively coupleable to another remote device 402 or to a server computing device (such as shown below in FIG. 5). Communication interface 414 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 406 are, for example, computer-readable instructions for providing a user interface to user 410 via media output component 408 and, optionally, receiving and processing input from input device 412. A user interface may include, among other possibilities, a web browser and client application. Web browsers enable users 410 to display and interact with media and other information typically embedded on a web page or a website from a web server associated with, for example, a merchant, a banking application and/or a bill pay application. A client application allows users 410 to interact with a server application associated with, for example, ABE computing device 101 and/or other component of the automatic billing enrollment system described herein.

Figure 5:
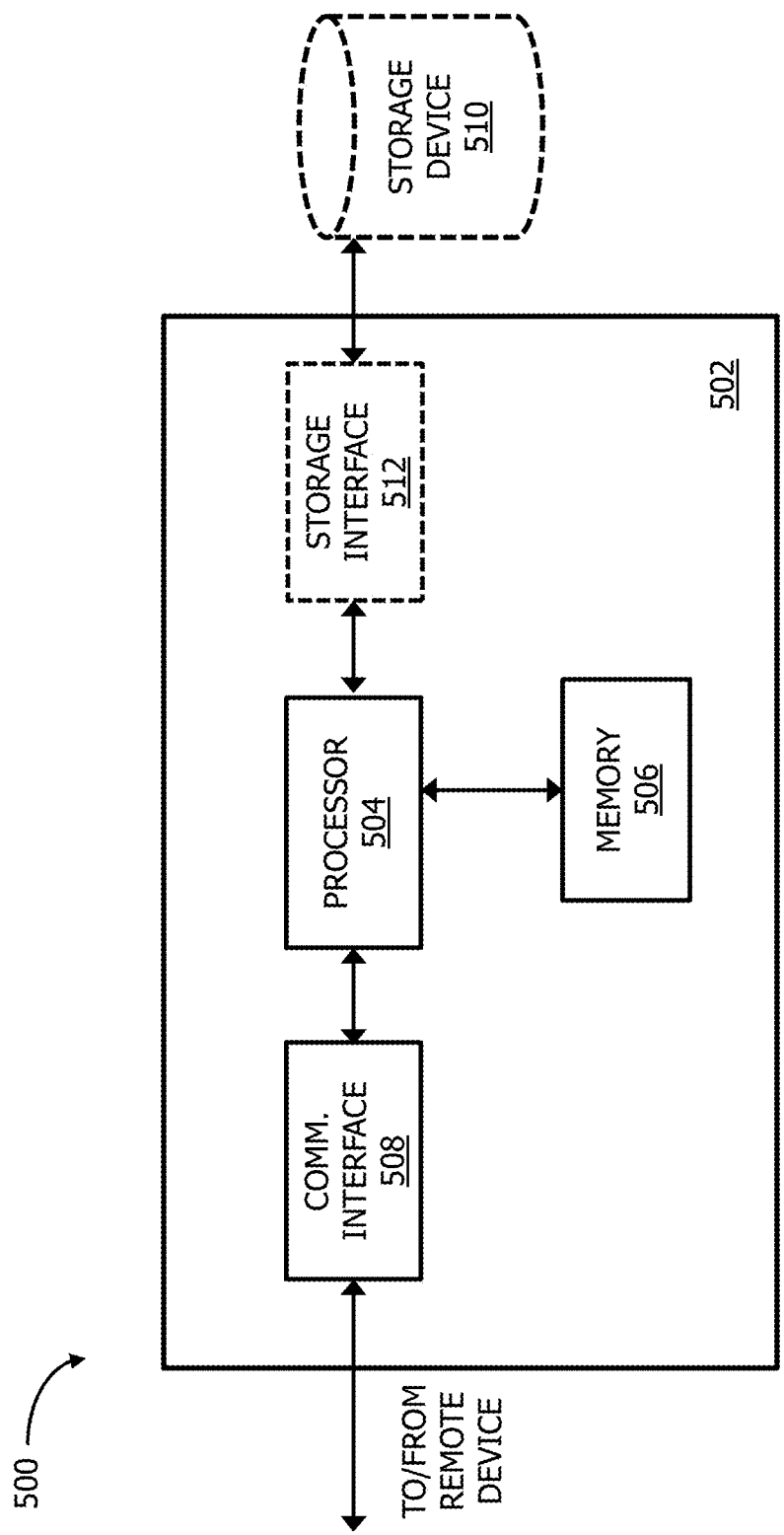

FIG. 5 illustrates an example configuration 500 of a server computing device 502, such as a server computing device on payment network 108 (shown in FIG. 1). Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as computing device 402 shown in FIG. 4 or ABE computing device 101.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 502 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 406 (shown in FIG. 4) and 506 (shown in FIG. 5) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 6:
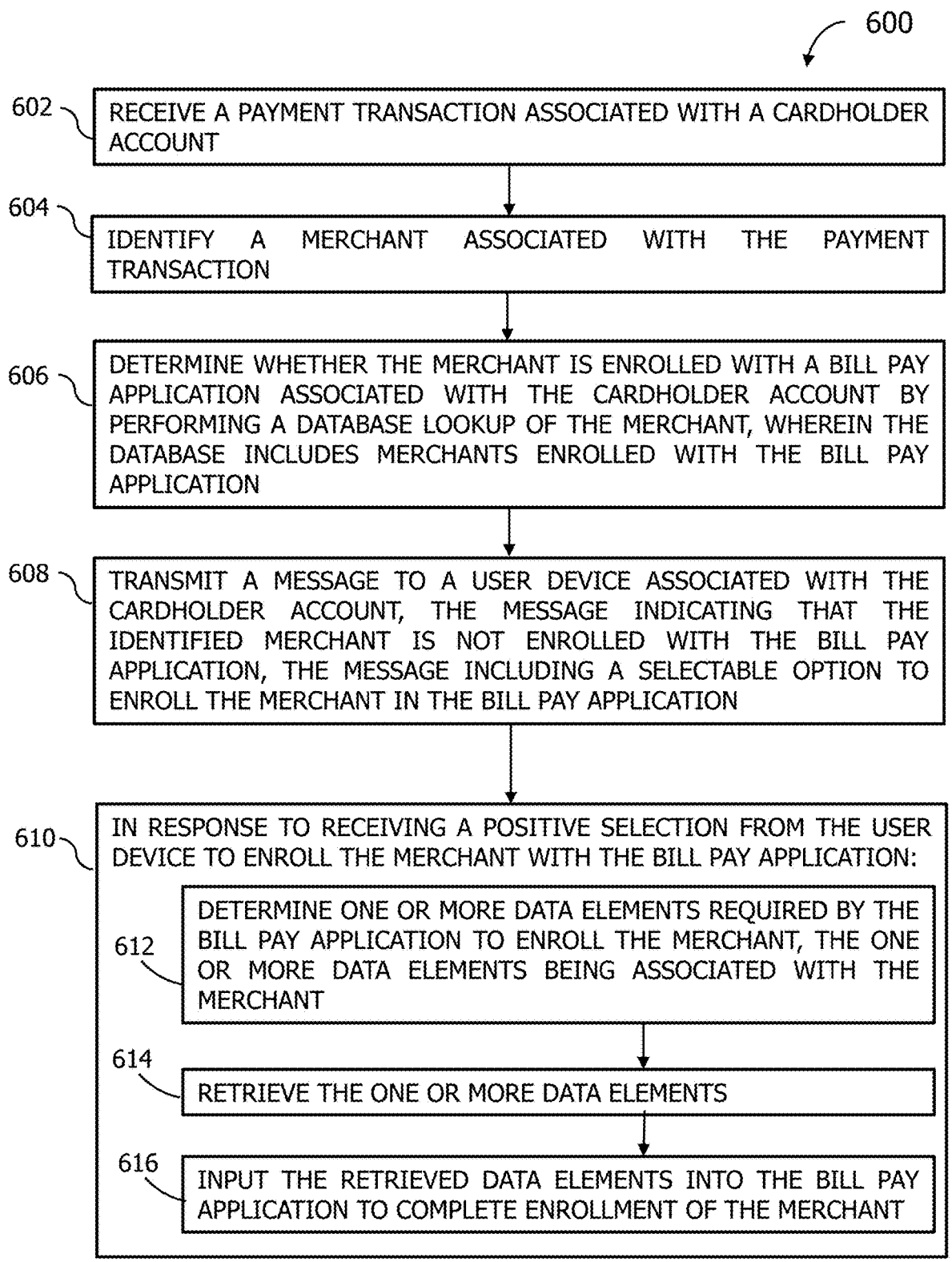

FIG. 6 is a flowchart of a method 600 for automatically enrolling a merchant with a bill pay application using the ABE computing device. In the example embodiment, method 600 is performed by an ABE computing device, such as ABE computing 101 (shown in FIG. 1). In certain embodiments, method 600 may be at least partially performed by a different computing device. In other embodiments, method 600 may include additional, fewer, or alternative actions, including those described elsewhere herein.

Method 600 begins with the ABE computing device receiving 602 a payment transaction associated with a cardholder account, and identifying 604 a merchant associated with the payment transaction. The ABE computing device also determines 606 whether the merchant is enrolled with a bill pay application associated with the cardholder account by performing a database lookup of the merchant, wherein the database includes merchants enrolled with the bill pay application. Method 600 further includes transmitting 608 a message to a user device associated with the cardholder account, the message indicating that the identified merchant is not enrolled with the bill pay application, the message including a selectable option to enroll the merchant in the bill pay application. Responsive to receiving 610 a positive selection from the user device to enroll the merchant with the bill pay application, the ABE computing device determines 612 one or more data elements required by the bill pay application to enroll the merchant, wherein the one or more data elements are associated with the merchant. Method 600 additionally includes retrieving 614 the one or more data elements, and inputting 616 the retrieved data elements into the bill pay application to complete enrollment of the merchant.

In some embodiments, transmitting step 608 further includes transmitting a message including a selectable option of one of a plurality of bill pay applications associated with the cardholder with which to enroll the merchant, such as when the bill pay application associated with the cardholder includes a plurality of bill pay applications associated with the cardholder.

In some embodiments, retrieving step 614 of method 600 further includes performing a database lookup of the merchant, wherein the database includes merchants enrolled with one or more bill pay applications associated with one or more cardholders. In embodiments when the merchant is found in the database lookup, the ABE computing device retrieves the one or more data elements from the database. In embodiments when the merchant is not found in the database lookup, the ABE computing device requests the one or more data elements from the merchant, receives the one or more data elements from the merchant, and stores the one or more data elements in the database.

In some embodiments, inputting step 616 of method 600 includes inputting the retrieved data elements via the user device. In some embodiments, inputting step 616 of method 600 includes inputting the retrieved data elements via the user device, the payment network, the bill pay application, and/or the issuer.

In some embodiments, method 600 further includes, following successful automatic enrollment of the merchant, transmitting a data scrub request message to the merchant. The data scrub request message may include a notification to the merchant that the cardholder has enrolled the merchant in a bill pay application, a request that the cardholder's payment account data be scrubbed/deleted from the merchant's database(s), and/or a notification that the merchant is no longer required and/or permitted to initiate any further pull-type payments from the cardholder's account(s).

Figure 7:
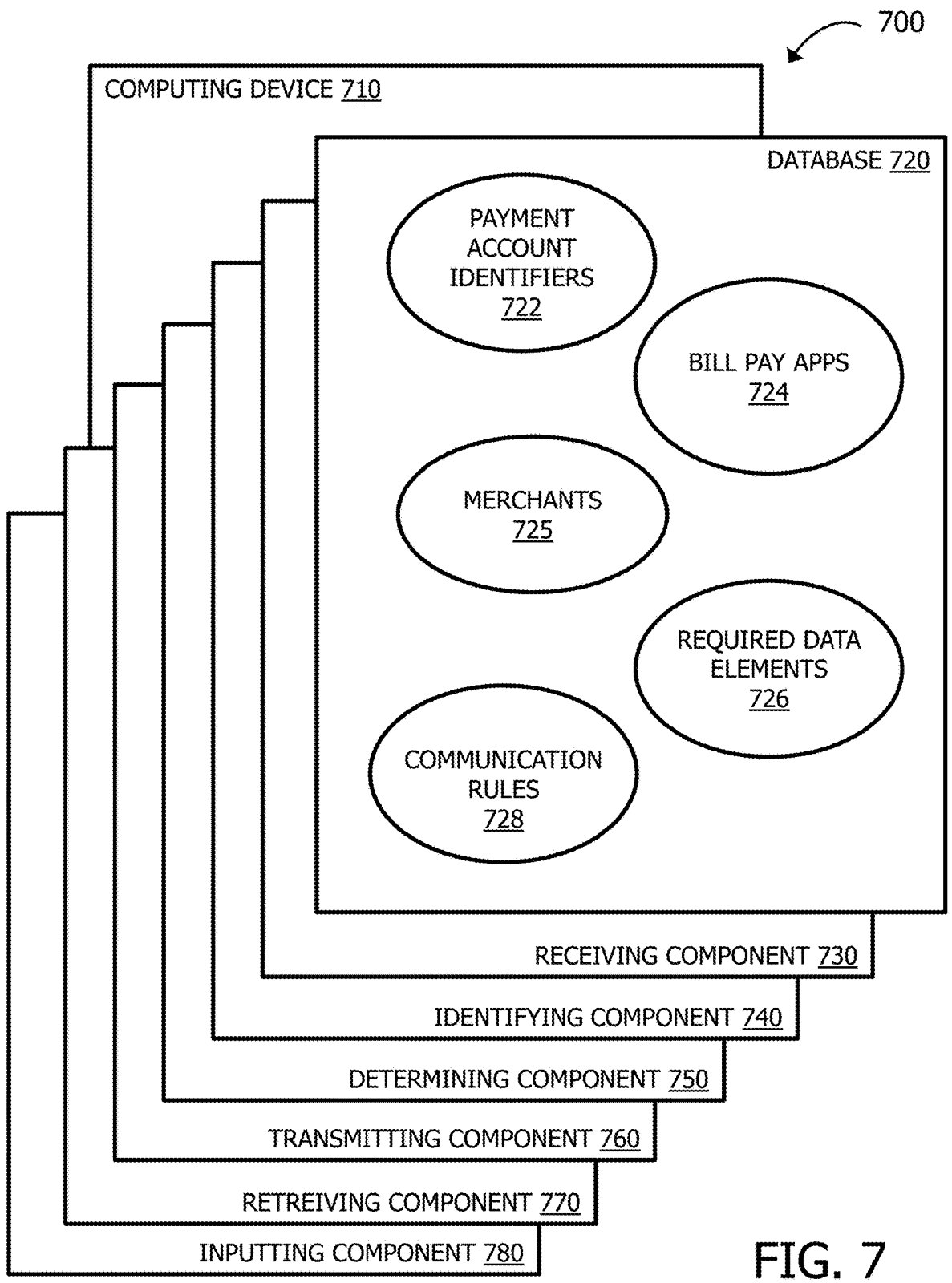

FIG. 7 is a diagram 700 of components of an example computing device 710 that may be used in method 600 shown in FIG. 6. In some embodiments, computing device 710 is similar to ABE computing device 101 (shown in FIG. 1). Computing device 710 includes a database 720 configured to store various information. Database 720 may be similar to database 301b (shown in FIG. 3). Database 720 may be coupled with several separate components within computing device 710, which perform specific tasks. In the illustrated embodiment, database 720 is divided into a plurality of sections and stores, including but not limited to, a cardholder/user payment account identifiers section 722 (similar to payment account identifiers 307 in FIG. 3), a bill pay apps section 724 (similar to bill pay apps 309 in FIG. 3), a merchants section 725 (similar to merchants 304 in FIG. 3), a required data elements section 726 (similar to required data elements 311 in FIG. 3), and a communication rules section 728 (similar to communication rules 315 in FIG. 3). Database 720 is interconnected to computing device 710 to receive, transmit, and/or update the information as required.

In the example embodiment, computing device 710 includes a receiving component 730 configured to receive a payment transaction associated with a cardholder account. In some embodiments, receiving component 730 is also configured to receive one or more data elements from the merchant. Computing device 710 further includes an identifying component 740 configured to identify a merchant associated with the payment transaction. Computing device 710 further includes a determining component 750 configured to determine whether the merchant is enrolled with the bill pay application of associated with the cardholder, as well as to determine one or more data elements required by the bill pay application to enroll the merchant. Computing device 710 also includes a transmitting component 760 configured to transmit a message to a user device associated with the cardholder account. In some embodiments, transmitting component 760 is further configured to transmit a notification to the user device upon completion of merchant enrollment. In some embodiments, transmitting component 760 is also configured to transmit a data scrub request message to the merchant. Computing device 710 additionally includes a retrieving component 770 configured to retrieve the one or more data elements. Computing device 710 additionally includes an inputting component 780 configured to input the retrieved data elements into the bill pay application to complete enrollment of the merchant.

Described herein are computer systems such as a payment processor (such as a payment network), a remote device (such as a cardholder computing device and a merchant computing device) and an ABE computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above examples are for example only, and are thus not intended to limit in any way the definition and/or meaning of the term "processor."

The terms database and memory, as used herein, refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor (e.g., 304, 404), including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be included in payment transaction data received by the ABE computing device and used as a method of payment for performing a transaction.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the ABE computing device is described herein as including general processing and memory devices, it should be understood that ABE computing device is a specialized computer system configured to perform the steps described herein for providing automatic enrollment of merchants with bill payment apps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatic billing enrollment (ABE) computing device comprising a processor communicatively coupled to a memory, said ABE computing device in communication with a payment network, said processor programmed to:
   receive a pull-type payment transaction associated with a cardholder account;
   identify a merchant associated with the pull-type payment transaction;
   determine whether the merchant is enrolled with a bill pay application associated with the cardholder account by performing a database lookup of the merchant, wherein the database includes merchants enrolled by the cardholder with the bill pay application;
   transmit a message to a user device associated with the cardholder account, the message indicating that the identified merchant is not enrolled by the cardholder with the bill pay application, the message including a selectable option for the cardholder to enroll the merchant in the bill pay application;
   in response to receiving a positive selection from the user device to enroll the merchant with the bill pay application:
      determine one or more data elements required by the bill pay application to enroll the merchant, the one or more data elements being associated with the merchant;
      retrieve the one or more data elements; and
      input the retrieved data elements into the bill pay application to complete enrollment of the merchant; and
   transmit a data scrub request message to the merchant, wherein the data scrub message comprises:
      a notification that the merchant is no longer permitted to initiate the pull-type payment from the cardholder account and that the cardholder will be providing payment to the merchant via a push-type payment; and
      a code snippet that, when executed by a merchant computing device, causes the merchant computing device to automatically delete data associated with the cardholder account so that the data associated with the cardholder is no longer stored at the merchant.

2. The ABE computing device of claim 1, wherein retrieving the one or more data elements comprises:
   performing a database lookup of the merchant, wherein the database includes merchants enrolled with one or more bill pay applications associated with one or more cardholders; and
   retrieving, when the merchant is found in the database lookup, the one or more data elements from the database.

3. The ABE computing device of claim 2, wherein, when the merchant is not found in the database lookup, retrieving the one or more data elements comprises:
   requesting the one or more data elements from the merchant;
   receiving the one or more data elements from the merchant; and
   storing the one or more data elements associated with the merchant in the database.

4. The ABE computing device of claim 1, wherein the bill pay application associated with the cardholder comprises a plurality of bill pay applications associated with the cardholder.

5. The ABE computing device of claim 4, wherein the selectable option to enroll the merchant in the bill pay application further includes a selectable option of one of the plurality of bill pay application associated with the cardholder with which to enroll the merchant.

6. The ABE computing device of claim 1, wherein inputting the retrieved data elements into the bill pay application comprises inputting the retrieved data elements via the user device.

7. A method for automatically enrolling a merchant in a bill paying application, said method performed using an automatic billing enrollment (ABE) computing device comprising a processor communicatively coupled to a memory, said ABE computing device in communication with a payment network, said method comprising:
   receiving a pull-type payment transaction associated with a cardholder account;
   identifying a merchant associated with the pull-type payment transaction;
   determining whether the merchant is enrolled with a bill pay application associated with the cardholder account by performing a database lookup of the merchant, wherein the database includes merchants enrolled by the cardholder with the bill pay application;
   transmitting a message to a user device associated with the cardholder account, the message indicating that the identified merchant is not enrolled by the cardholder with the bill pay application, the message including a selectable option for the cardholder to enroll the merchant in the bill pay application;
   responsive to receiving a positive selection from the user device to enroll the merchant with the bill pay application:
      determining one or more data elements required by the bill pay application to enroll the merchant, the one or more data elements being associated with the merchant;
      retrieving the one or more data elements; and
      inputting the retrieved data elements into the bill pay application to complete enrollment of the merchant; and
   transmitting a data scrub request message to the merchant, wherein the data scrub message comprises:
      a notification that the merchant is no longer permitted to initiate the pull-type payment from the cardholder account and that the cardholder will be providing payment to the merchant via a push-type payment; and
      a code snippet that, when executed by a merchant computing device, causes the merchant computing device to automatically delete data associated with the cardholder account so that the data associated with the cardholder is no longer stored at the merchant.

8. The method of claim 7, wherein retrieving the one or more data elements comprises:
   performing a database lookup of the merchant, wherein the database includes merchants enrolled with one or more bill pay applications associated with one or more cardholders; and
   retrieving, when the merchant is found in the database lookup, the one or more data elements from the database.

9. The method of claim 8, wherein when the merchant is not found in the database lookup retrieving the one or more data elements comprises:
  requesting the one or more data elements from the merchant;
  receiving the one or more data elements from the merchant; and
  storing the one or more data elements associated with the merchant in the database.

10. The method of claim 7, wherein the bill pay application associated with the cardholder comprises a plurality of bill pay applications associated with the cardholder.

11. The method of claim 10, wherein the selectable option to enroll the merchant in the bill pay application further includes a selectable option of one of the plurality of bill pay application associated with the cardholder with which to enroll the merchant.

12. The method of claim 7, wherein inputting the retrieved data elements into the bill pay application comprises inputting the retrieved data elements via the user device.

13. A non-transitory computer-readable storage medium having computer-executable instructions embodied thereon, wherein when executed by an automatic billing enrollment (ABE) computing device comprising a processor communicatively coupled to a memory, said ABE computing device in communication with a payment network, the computer-executable instructions cause the ABE computing device to:
  receive a pull-type payment transaction associated with a cardholder account;
  identify a merchant associated with the pull-type payment transaction;
  determine whether the merchant is enrolled with a bill pay application associated with the cardholder account by performing a database lookup of the merchant, wherein the database includes merchants enrolled by the cardholder with the bill pay application;
  transmit a message to a user device associated with the cardholder account, the message indicating that the identified merchant is not enrolled by the cardholder with the bill pay application, the message including a selectable option for the cardholder to enroll the merchant in the bill pay application;
  in response to receiving a positive selection from the user device to enroll the merchant with the bill pay application:
    determine one or more data elements required by the bill pay application to enroll the merchant, the one or more data elements being associated with the merchant;
    retrieve the one or more data elements; and
    input the retrieved data elements into the bill pay application to complete enrollment of the merchant; and
  transmit a data scrub request message to the merchant, wherein the data scrub message comprises:
    a notification that the merchant is no longer permitted to initiate the pull-type payment from the cardholder account and that the cardholder will be providing payment to the merchant via a push-type payment; and
    a code snippet that, when executed by a merchant computing device, causes the merchant computing device to automatically delete data associated with the cardholder account so that the data associated with the cardholder is no longer stored at the merchant.

14. The non-transitory computer-readable storage media of claim 13, wherein retrieving the one or more data elements comprises:
  performing a database lookup of the merchant, wherein the database includes merchants enrolled with one or more bill pay applications associated with one or more cardholders; and
  retrieving, when the merchant is found in the database lookup, the one or more data elements from the database.

15. The non-transitory computer-readable storage media of claim 14, wherein when the merchant is not found in the database lookup, the computer-executable instructions further cause the processor to:
  request the one or more data elements from the merchant;
  receive the one or more data elements from the merchant; and
  store the one or more data elements associated with the merchant in the database.

16. The non-transitory computer-readable storage media of claim 13, wherein the bill pay application associated with the cardholder comprises a plurality of bill pay applications associated with the cardholder.

17. The non-transitory computer-readable storage media of claim 15, wherein the selectable option to enroll the merchant in the bill pay application further includes a selectable option of one of the plurality of bill pay application associated with the cardholder with which to enroll the merchant.

18. The non-transitory computer-readable storage media of claim 13, wherein inputting the retrieved data elements into the bill pay application comprises inputting the retrieved data elements via the user device.

* * * * *